United States Patent [19]
Young

[11] Patent Number: 5,895,178
[45] Date of Patent: Apr. 20, 1999

[54] LARGE HOLE CUTTER

[76] Inventor: Ralph C. Young, 2119 Payton Cir., Colorado Springs, Colo. 80915-1330

[21] Appl. No.: 09/050,875

[22] Filed: Mar. 31, 1998

[51] Int. Cl.⁶ .......................... B23B 41/02; B23B 51/00
[52] U.S. Cl. .......................... 409/206; 144/21; 144/218; 144/93.1; 408/703
[58] Field of Search .................. 144/21, 23, 92, 144/218, 93.1; 408/27, 56, 204, 205, 206, 207, 703

[56] References Cited

U.S. PATENT DOCUMENTS

| | | | |
|---|---|---|---|
| 2,435,648 | 2/1948 | Frevel | 144/23 |
| 4,147,464 | 4/1979 | Watson et al. | 408/206 |
| 4,652,185 | 3/1987 | Malrick | 408/205 |
| 4,950,111 | 8/1990 | Thomas | 408/206 |

Primary Examiner—W. Donald Bray
Attorney, Agent, or Firm—G. F. Gallinger

[57] ABSTRACT

A cutting tool having spaced elongate teeth. The tool facilitates 1) the removal of cut particles from the surface to be cut thereby enabling efficient cutting particularly of deeper holes; and, 2) the removal of the center cut out portion from the cutting tool. The tool comprises: a pilot drill bit; an anchoring disk fixed to and around a rear central portion of the drill bit; a plurality of peripherally spaced elongate teeth each having a rear end portion held in the anchoring disk, and a front end portion having a cutting edge; a sliding guide disk slidably positioned around the drill bit and in front of the anchoring disk so that the elongate teeth are radially positioned thereby; bias means to bias the sliding guide disk in a forward position; and, retention means to prevent the guide disk from sliding forwardly on the pilot drill bit beyond the cutting edges of the teeth.

20 Claims, 1 Drawing Sheet

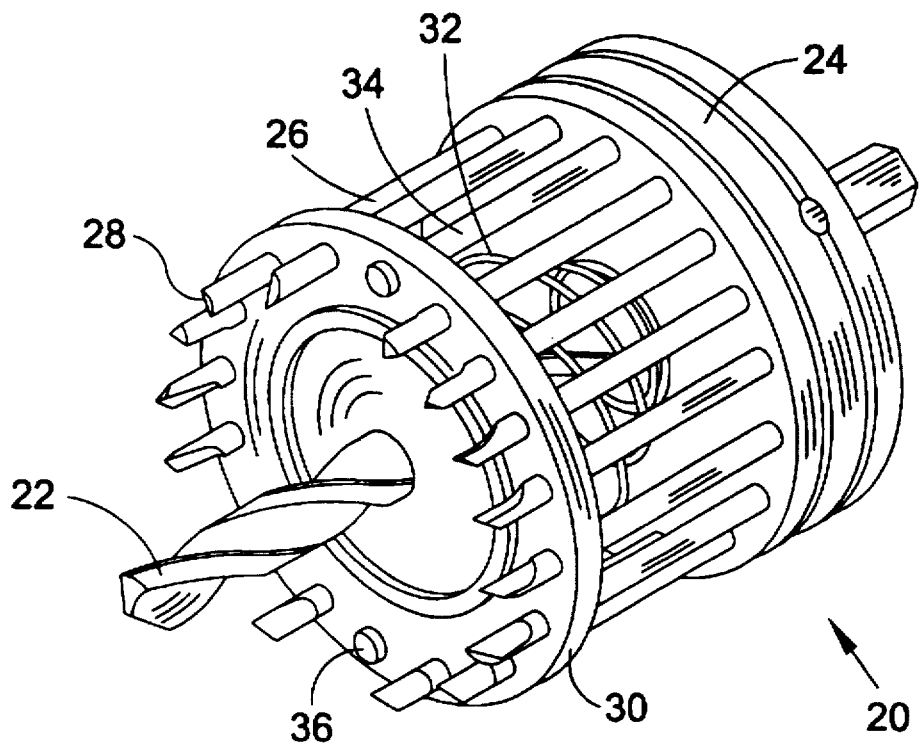
Fig. 1
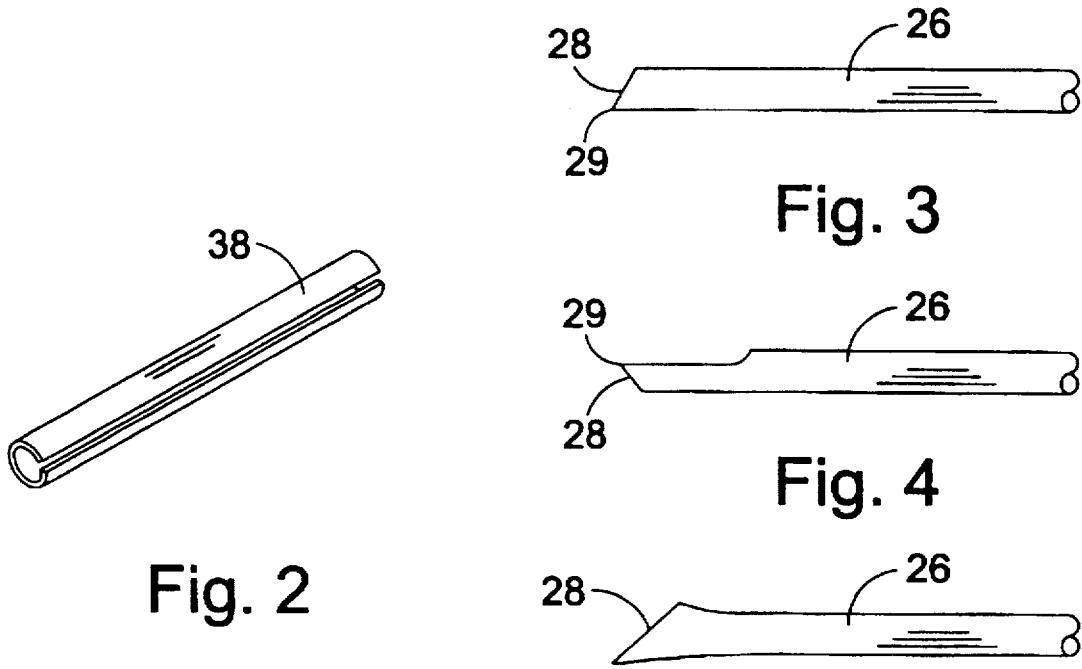
Fig. 2
Fig. 3
Fig. 4
Fig. 5

5,895,178

LARGE HOLE CUTTER

FIELD OF INVENTION

This invention relates to cutters used to drill large diameter holes. More particularly this invention relates to a rotating cutter having spaced elongate teeth. These elongate teeth facilitate removal of cut particles and thereby promote efficient cutting, particularly in deeper holes. The elongate teeth also result in easy removal of the cut out central portion of the hole.

BACKGROUND OF THE INVENTION

Large hole cutters used to cut porous materials typically are a cylindrical sleeve having triangular teeth around one end portion thereof. The problem with these cutters is that they are slow, particularly in the bottom of deeper holes. This is because the teeth ride on the cut particles above the surface to be cut. These particles cannot be removed. This problem is so severe that a large diameter hole cut through dimension lumber must be cut first from one side of the board, and then the other. Another problem with conventional large diameter hole cutters is that the center cut out portion of the hole is tightly stuck within the sleeve of the cutting tool. It must be evenly pried out of the tool. The removal of this central portion frequently requires greater effort for a longer time than the cutting of the hole. Particularly for overhead applications, there is a great need for a cutting tool which is faster, which doesn't require cutting from opposite sides, and which automatically ejects the center cut out portion of the hole.

OBJECTS AND STATEMENT OF INVENTION

It is an object of this invention to disclose a cutting tool having spaced elongate teeth. A design which will facilitate 1 the removal of cut particles from the surface to be cut thereby enabling efficient cutting particularly of deeper holes; and, 2) the removal of the center cut out portion from the cutting tool.

One aspect of this invention provides for a large hole cutter for drilling a hole in a workpiece comprising: a pilot drill bit; an anchoring disk fixed to and around a rear central portion of the drill bit; a plurality of peripherally spaced elongate teeth each having a rear end portion held in the anchoring disk, and a front end portion having a cutting edge; a sliding guide disk slidably positioned around the drill bit and in front of the anchoring disk so that the elongate teeth are radially positioned thereby; bias means to bias the sliding guide disk in a forward position; and, retention means to prevent the guide disk from sliding forwardly on the pilot drill bit beyond the cutting edges of the teeth. When a hole is drilled, the pilot drill bit first centers the cutter and the elongate teeth then cut a circular groove in the workpiece pushing the sliding guide disk rearwardly as the depth of the cut increases until the work workpiece is cut clear through. Thereafter the sliding disk may be slid forwardly automatically discharging the central cut out portion from within the cutter.

A preferred aspect of this invention provides for a cutter as above wherein the elongate teeth and retention means are generally cylindrical and wherein the spaces between teeth and the anchoring members are generally equal.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawings wherein:

FIG. 1 is a perspective view of a large hole cutter.

FIG. 2 is an enlarged view of a split sleeve used to secure the large diameter hole cutter to its pilot drill bit.

FIG. 3 is a tangential view of any one tooth shown in FIG. 1.

FIG. 4 is a radial view of a tooth shown in FIG. 3.

FIG. 5 is a tangential view of a tooth having a broadened end portion to provide clearance in the cut.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a large hole cutter 20 used for drilling a hole (not shown) in a workpiece (not shown). The cutter 20 comprises: a pilot drill bit 22; an anchoring disk 24 fixed to and around a rear central portion of the drill bit 22; a plurality of peripherally spaced elongate teeth 26 each having a rear end portion held in the anchoring disk 24, and a front end portion having a cutting edge 28; and, a sliding guide 30 disk slidably positioned around the drill bit 22 and in front of the anchoring disk 24 so that the elongate teeth 26 are radially and peripherally positioned thereby.

A bias means which preferably is a conical spring 32, is positioned between the anchoring disk 24 and the sliding guide disk 30 to bias the sliding guide disk 30 in a forward position. The spring 32 has the smaller diameter end positioned around the drill bit 22 adjacent to the anchoring disk 24.

A retention means which most preferably is a retention pin 34 prevents the guide disk 30 from sliding forwardly on the pilot drill bit 22 beyond the cutting edges 28 of the teeth 26. When a hole is drilled, the pilot drill bit 22 first centers the cutter 20 and the elongate teeth 26 then cut a circular groove in the workpiece, pushing the sliding guide disk 30 rearwardly as the depth of the cut increases until the hole (not shown) is cut clear through the workpiece (not shown). Thereafter the sliding disk 30 may be slid forwardly, automatically discharging a central cut out portion (not shown) from within the cutter 20.

Most preferably the elongate teeth 26 are generally cylindrical and held in a position parallel to the pilot drill bit 22. Most preferably the retention means comprises a cylindrical pin 34 having one end held in the anchoring disk 24 and another opposite head end 36 to prevent the guide disk 23 from sliding thereover. In the preferred embodiment the peripheral spaces between teeth 26 and the cylindrical pins 34 are generally equal. The sliding guide disk 30 has peripherally spaced holes therethrough sized to matingly accept the teeth 26 and the pins 34.

Generally less than leighteen teeth 26 have found to be sufficient for all diameters of cutters 20. In the most preferred embodiment there are twelve teeth 26, and two pins 34. Two pins 34 have been found to be satisfactory when the cutter 20 is for a 2 ¾" or smaller hole size, when larger, then three pins 34 are preferred. The pilot drill bit 22 is preferably

3

⅛" in diameter. Teeth 26 made of ⅛" diameter piano wire have been found to work well. In the most preferred embodiment the anchoring disk 24 is made of plastic, and the guide disk 30 is made of metal to withstand heat generated by friction during cutting.

FIG. 2 is an enlarged view of a split sleeve 38 used to secure the large diameter hole cutter 20 to its pilot drill bit 22. It has been found that if a rear central portion of the pilot drill bit 22 has a lateral hole (not shown) therethrough, the anchoring disk 24 may most satisfactorily be secured to the pilot drill bit 22 with a cylindrical split sleeve 38 positioned in the lateral hole (not shown) and through a radial hole 40 in the anchoring disk 24.

FIG. 3 is a tangential view of any one tooth 26 shown in FIG. 1. FIG. 4 is a radial view of the tooth 26 shown in FIG. 3. The teeth 26 have a flat cutting edge 28 which extends generally radially and have a longer interior side 29 so that the interior side of the circular groove (not shown) is first cut. The teeth 26 are marginally turned so that they will push inwardly against the sliding guide disk 30 as they cut.

FIG. 5 is a tangential view of a tooth 26 having a broadened end portion 28 to provide clearance in the cut (not shown). Teeth 26 having a uniform diameter are generally satisfactory for most applications.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A large hole cutter for drilling a hole in a workpiece comprising:

a pilot drill bit;

an anchoring disk fixed to and around a rear central portion of the pilot drill bit;

a plurality of peripherally spaced elongate teeth, each having a rear end portion held in the anchoring disk, and a front end portion having a cutting edge, whereby when thrust is applied to the drill bit it is directly transferred to the cutting edges of the elongate teeth;

so that when a hole is cut the pilot drill bit first centers the cutter and the elongate teeth then cut a circular groove in the workpiece, and thereafter the elongate teeth may flex radially outward, allowing a central cut out portion to be easily discharged from within the cutter.

2. A cutter as in claim 1 wherein the elongate teeth are each held in a position parallel do the pilot drill bit.

3. A cutter as in claim 2 wherein the elongate teeth are generally cylindrical.

4. A large hole cutter for drilling a hole in a workpiece comprising:

a pilot drill bit;

an anchoring disk fixed to and around a rear central portion of the drill bit;

a plurality of peripherally spaced elongate teeth each having a rear end portion held in the anchoring disk, and a front end portion having a cutting edge whereby when thrust is applied to the drill bit it is directly transferred to the cutting edges of the elongate teeth;

4 a sliding guide disk slidably positioned around the drill bit and in front of the anchoring disk so that the front end portions of the elongate teeth are radially and peripherally positioned thereby;

bias means to bias the sliding guide disk in a forward position; and, retention means to prevent the guide disk from sliding forwardly on the pilot drill bit beyond the cutting edges of the teeth;

so that when a hole is drilled the pilot drill bit first centers the cutter and the elongate teeth then cut a circular groove in the workpiece pushing the sliding guide disk rearwardly as the depth of the cut increases until the work workpiece is cut clear through; thereafter the elongate teeth may flex radially outward and the sliding disk may slide forwardly easily discharging a central cut out portion from within the cutter.

5. A cutter as in claim 4 wherein the elongate teeth are each held in a position parallel to the pilot drill bit.

6. A cutter as in claim 5 wherein the elongate teeth have a maximum width which is less than 20% of their length.

7. A cutter as in claim 6 wherein the elongate teeth have a maximum width which is less than 10% of their length.

8. A cutter as in claim 5 wherein the elongate teeth are generally cylindrical.

9. A cutter as in claim 8 wherein the bias means comprises a spring positioned between the anchoring disk and the sliding guide disk.

10. A cutter as in claim 9 wherein the spring is generally conical and has a smaller diameter end positioned around the drill bit adjacent to the anchoring disk.

11. A cutter as in claim 9 wherein the retention means comprises a cylindrical pin having one end held in the anchoring disk and another opposite head end to prevent the guide disk from sliding thereover.

12. A cutter as in claim 11 wherein the peripheral spaces between teeth and the cylindrical pins are generally equal.

13. A cutter as in claim 11 wherein there are less or equal to eighteen teeth and three pins.

14. A cutter as in claim 5 wherein the teeth have a flat cutting edge which extends generally radially, and have a longer interior side so that the interior side of the circular groove is cut first.

15. A cutter as in claim 5 wherein the sliding guide disk has peripherally spaced holes therethrough sized to matingly the accept the teeth and the pins.

16. A cutter as in claim 5 wherein the teeth have a flat cutting edge which extends generally radially but which is marginally turned so that the teeth will push inwardly against the sliding guide disk as they cut.

17. A cutter as in claim 16 wherein the anchoring disk is plastic, and the guide disk is metal to withstand heat generated during cutting.

18. A cutter as in claim 17 wherein the teeth have an enlarged end portion to provide clearance in the circular groove as the depth of cut increases.

19. A cutter as in claim 4 wherein a rear central portion of the pilot drill bit has a lateral hole therethrough for securing the anchoring disk thereto.

20. A cutter as in claim 19 further comprising a cylindrical split sleeve positioned through the lateral hole to secure the anchoring disk to the drill bit.

* * * * *